United States Patent
Suryanarayana et al.

(10) Patent No.: US 11,144,328 B2
(45) Date of Patent: Oct. 12, 2021

(54) SYSTEM METHOD TO UPDATE FAILOVER PROCESS BY RUNNING BASIC INPUT/OUTPUT (BIOS) SYSTEM BOOT CODE FROM NON-VOLATILE MEMORY EXPRESS DEVICE (NVME)

(71) Applicant: Dell Products L.P., Round Rock, TX (US)

(72) Inventors: Shekar Babu Suryanarayana, Bangalore (IN); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 40 days.

(21) Appl. No.: 16/780,372

(22) Filed: Feb. 3, 2020

(65) Prior Publication Data

US 2021/0240488 A1     Aug. 5, 2021

(51) Int. Cl.
*G06F 9/4401* (2018.01)
*G06F 13/16* (2006.01)

(52) U.S. Cl.
CPC ........ *G06F 9/4406* (2013.01); *G06F 13/1668* (2013.01)

(58) Field of Classification Search
CPC ............................ G06F 9/4406; G06F 13/1668
See application file for complete search history.

(56) References Cited

U.S. PATENT DOCUMENTS

| | | | | |
|---|---|---|---|---|
| 9,830,079 | B2* | 11/2017 | Kanno | G06F 3/0679 |
| 10,732,889 | B2* | 8/2020 | Suryanarayana | G06F 3/0644 |
| 2018/0239697 | A1* | 8/2018 | Huang | G06F 12/0246 |
| 2019/0163557 | A1* | 5/2019 | Nguyen | G11C 29/883 |
| 2020/0394303 | A1* | 12/2020 | Suryanarayana | G06F 8/654 |

* cited by examiner

*Primary Examiner* — Tammara R Peyton
(74) *Attorney, Agent, or Firm* — Kirton Mcconkie; Brian Tucker (57) ABSTRACT

A BIOS boot and update failover process is provided. A computing system can include flash storage on which the BIOS is stored, an embedded controller and an NVMe drive. After the BIOS successfully performs a boot process, a failover module can be executed to create a BIOS namespace on an NVMe namespace and then store a copy of the BIOS on the NVMe namespace. The failover module can also create a device path that identifies where the copy of the BIOS is stored on the NVMe namespace and store the device path on the embedded controller. The embedded controller can be configured to detect when the BIOS on the flash storage fails to initiate a subsequent boot process and, in response, employ the device path to locate and load the copy of the BIOS from the NVMe namespace to thereby cause the computing system to be booted.

20 Claims, 9 Drawing Sheets

SYSTEM METHOD TO UPDATE FAILOVER PROCESS BY RUNNING BASIC INPUT/OUTPUT (BIOS) SYSTEM BOOT CODE FROM NON-VOLATILE MEMORY EXPRESS DEVICE (NVME)

CROSS-REFERENCE TO RELATED APPLICATIONS

N/A

BACKGROUND

BIOS firmware (BIOS) is the first software that is executed on the central processing unit (CPU) when a computing system is powered on. The primary task of the BIOS is to initialize the hardware and load the operating system (OS). For purposes of this specification and the claims, the term BIOS should be construed as encompassing conventional (legacy) BIOS, Unified Extensible Firmware Interface (UEFI) BIOS and any other similar firmware that is used to boot a computing system.

Figure 1:
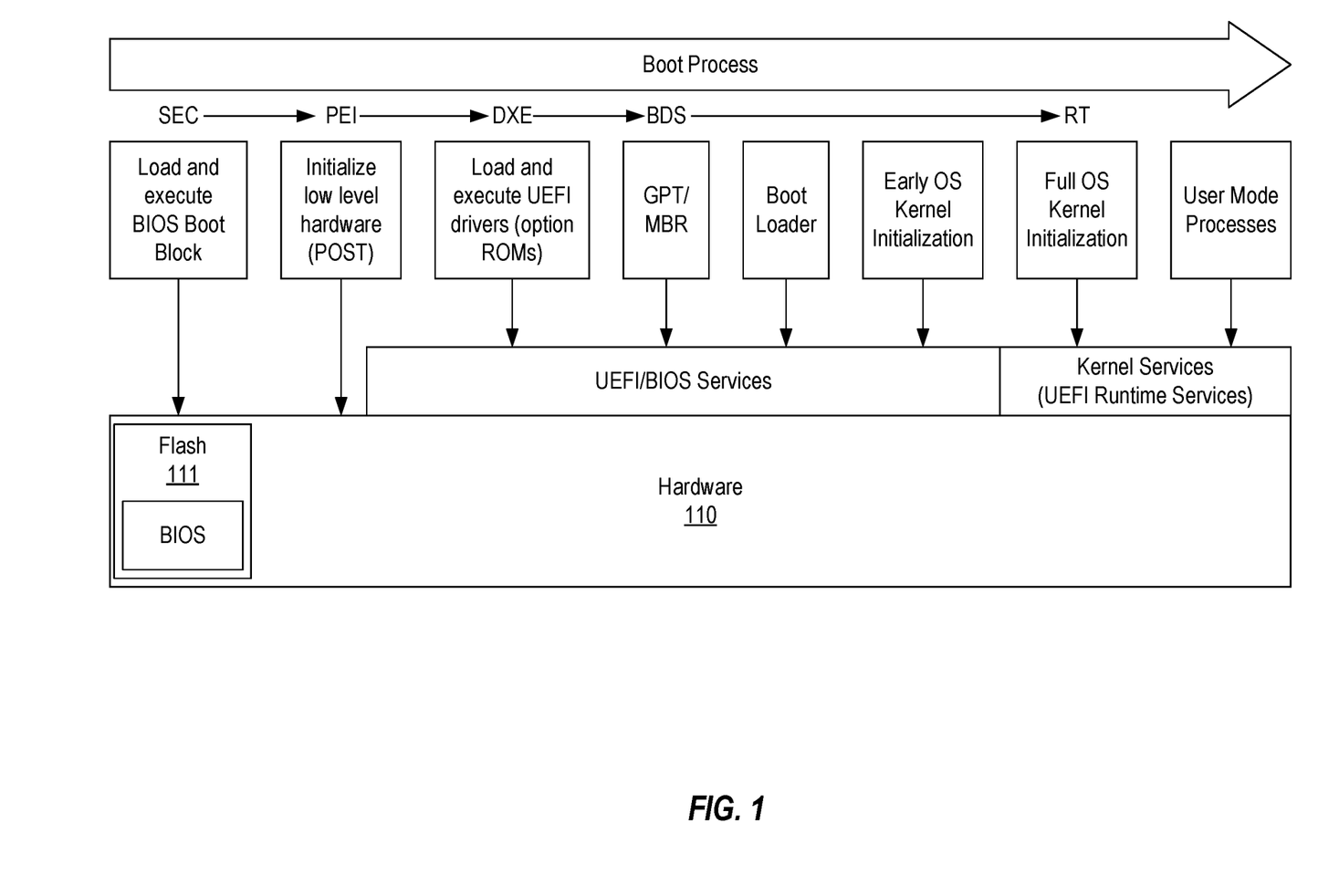
FIG. 1 illustrates an example of a typical boot process that can be performed on a computing system including various components that are involved in the typical boot process.

FIG. 1 represents the boot process that the BIOS performs on a computing system. FIG. 1 is intended to encompass both conventional BIOS and UEFI boot processes but will be described primarily in the context of the UEFI. FIG. 1 depicts hardware 110 which can represent all of the various types of hardware that may exist on a computing system including flash 111. Flash 111, which may be in the form of Serial Peripheral Interconnect (SPI) flash, is commonly employed to store the boot block or, in some cases, multiple boot blocks (e.g., a primary boot block and a secondary boot block on Intel-based systems that support the Top-Block Swap mode). The boot block is the initial firmware that is loaded and executed when the computing system is powered on or resets (e.g., the code that the reset vector points to). Flash 111 may also typically store other portions of the BIOS (e.g., UEFI variables).

During the PEI phase, PEIM modules (or drivers) are loaded to initialize the low level hardware such as the system memory. Additional UEFI services are also loaded and provide an interface for subsequent stages including the Driver Execution Environment (DXE) phase in which UEFI drivers are loaded to perform a variety of tasks. The boot process will then transition to the Boot Device Selection (BDS) phase where the GUID Partition Table (GPT) or Master Boot Record (MBR) is accessed to identify and load the OS boot loader. The OS boot loader will then load the OS kernel and transfer control the OS.

Because the boot process begins with the loading of the BIOS from flash 111, if the BIOS (and particularly, the boot block) is corrupted, the computing system will fail to boot. Some recovery techniques exist which can employ a limited set of storage drives such as a USB flash drive or CD/DVD drive. These recovery techniques are manual and are not user friendly. For example, to trigger BIOS recovery from a storage drive, the end user will typically need to press a particular key combination when the computing system is powering on or possibly even remove a jumper from the motherboard to cause the computing system to look for BIOS on a storage drive rather than in flash 111. With these techniques, even if the computing system can be booted from BIOS on the storage drive, it still may not be possible to correct the issue with the existing BIOS. For example, if flash 111 has failed, it will not be possible to update/correct the existing BIOS. As a result, a storage-drive-based recovery technique would need to be employed each time the computing system is booted.

Another recovery technique exists in which primary and secondary boot blocks are provided. With this recovery technique, if the primary boot block is corrupted (e.g., during a firmware update), the secondary boot block can automatically be loaded and executed. However, both the primary and secondary boot blocks are stored on flash 111 (or another chip such as a firmware hub). Therefore, if flash 111 fails or otherwise becomes inaccessible, neither boot block will be available to initiate the boot process. In such cases, it is not uncommon to replace the entire motherboard since replacing flash 111 alone may not work. A similar recovery technique exists in which a second, separate flash (or the Known Good Image flash) is provided on the motherboard as read-only storage of a factory BIOS image. In such cases, if the computing system fails to boot from flash 111 (or the Current Image flash), the computing system can be reset and caused to boot from the factory BIOS image in the separate flash. Although this technique provides a recovery mechanism that addresses scenarios where flash 111 may fail, it can only be implemented on computing systems that were factory-designed to support the technique. In short, an adequate automated solution for recovering BIOS on a wide range of computing systems does not currently exist.

BRIEF SUMMARY

The present invention extends to methods, systems, and computer program products for performing a BIOS boot and update failover process. A computing system can include flash storage on which the BIOS is stored, an embedded controller and a Non-Volatile Memory Express (NVMe) drive. After the BIOS successfully performs a boot process, a failover module can be executed to create a BIOS namespace on a NVMe namespace and then store a copy of the BIOS on the NVMe namespace. The failover module can also create a device path that identifies where the copy of the BIOS is stored on the NVMe namespace and store the device path on the embedded controller. The embedded controller can be configured to detect when the BIOS on the flash storage fails to initiate a subsequent boot process and, in response, employ the device path to locate and load the copy of the BIOS from the NVMe namespace to thereby cause the computing system to be booted.

In some embodiments, the present invention is implemented as a method for booting a computing. In response to a BIOS portion that is stored on flash storage of a computing system having been executed to perform a boot process, a failover module can cause a copy of the BIOS portion to be stored on an NVMe namespace. In conjunction with causing the copy of the BIOS portion to be stored on the NVMe namespace, the failover module can cause a device path to be stored on an embedded controller. The device path identifies where the copy of the BIOS portion is stored on the NVMe namespace. In response to the embedded controller detecting that the BIOS portion stored on flash storage has failed to load as part of an attempt to perform the boot process, the embedded controller can then use the device path to cause the copy of the BIOS portion to be loaded to perform the boot process.

In some embodiments, the present invention is implemented as a computing system that includes a central processing unit, system memory, flash storage on which a BIOS portion is stored, an embedded controller, an NVMe drive and a failover module that is configured to execute during a boot process. The failover module creates a BIOS namespace on the NVMe drive, causes a copy of the BIOS portion to be stored on the BIOS namespace and causes the embedded controller to store a device path to the copy of the BIOS portion that is stored on the BIOS namespace.

In some embodiments, the present invention is implemented as computer storage media storing computer executable instructions which when executed on a computing system implement a method comprising: in response to detecting that a BIOS portion stored on a flash storage has successful performed a boot process, causing a copy of the BIOS portion to be stored on a BIOS namespace on an NVMe drive; creating a device path that identifies the BIOS namespace and where the copy of the BIOS portion is stored on the BIOS namespace; and causing the device path to be stored on an embedded controller.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Although the term "boot block" is most commonly used with reference to computing systems having Intel CPUs, in the specification and the claims, the term "boot block" should not be limited to Intel-specific environments. Instead, "boot block" should be construed as a portion of the BIOS that is initially loaded and executed when a computing system is powered on or reset to initiate the boot process on the computing system. The term "BIOS image" should be construed as a portion of the BIOS that is loaded and executed as part of the boot process. Examples of BIOS images include code that implements a UEFI platform, a PEI module (PEIM), a UEFI boot manager, a DXE driver, a DXE application, a UEFI OS loader, option ROMs, etc.

Figure 2:
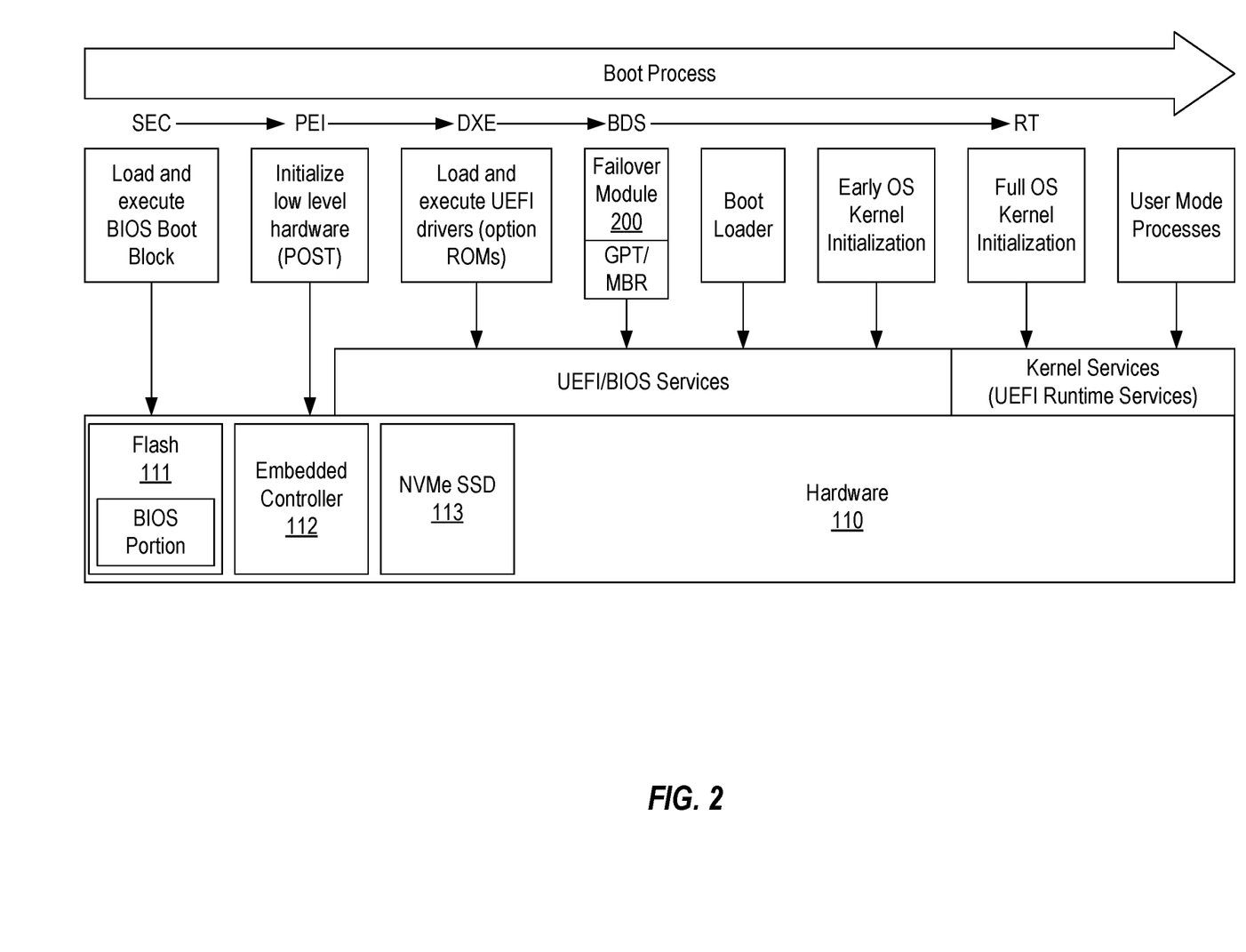
FIG. 2 illustrates an example of a boot process that can be performed on a computing system in accordance with embodiments of the present invention including various components that are involved in the boot process.

FIG. 2, which is based on FIG. 1, illustrates various additional components that may be employed on a computing system to implement embodiments of the present invention. In addition to flash 111, hardware 110 also includes embedded controller 112 and a NVMe solid-state drive (SSD) 113. Although not shown, hardware 110 would also include Peripheral Component Interconnect Express (PCIe) components by which NVMe SSD 113 connects to and communicates with the computing system. FIG. 2 also illustrates that the computing system's firmware includes a failover module 200 (e.g., a UEFI application/driver or Option ROM) that may execute during the boot process such as during the BDS phase in UEFI-based implementations.

In FIG. 2, flash 111 is shown as storing a "BIOS portion." In this context, the term "BIOS portion" should be construed as encompassing at least the boot block as that term is defined above. In some embodiments, the BIOS portion in flash 111 may also include other components of the BIOS and even all of the BIOS. However, in some implementations, some components that may be considered as being part of the BIOS may be stored in other locations.

Figure 3:
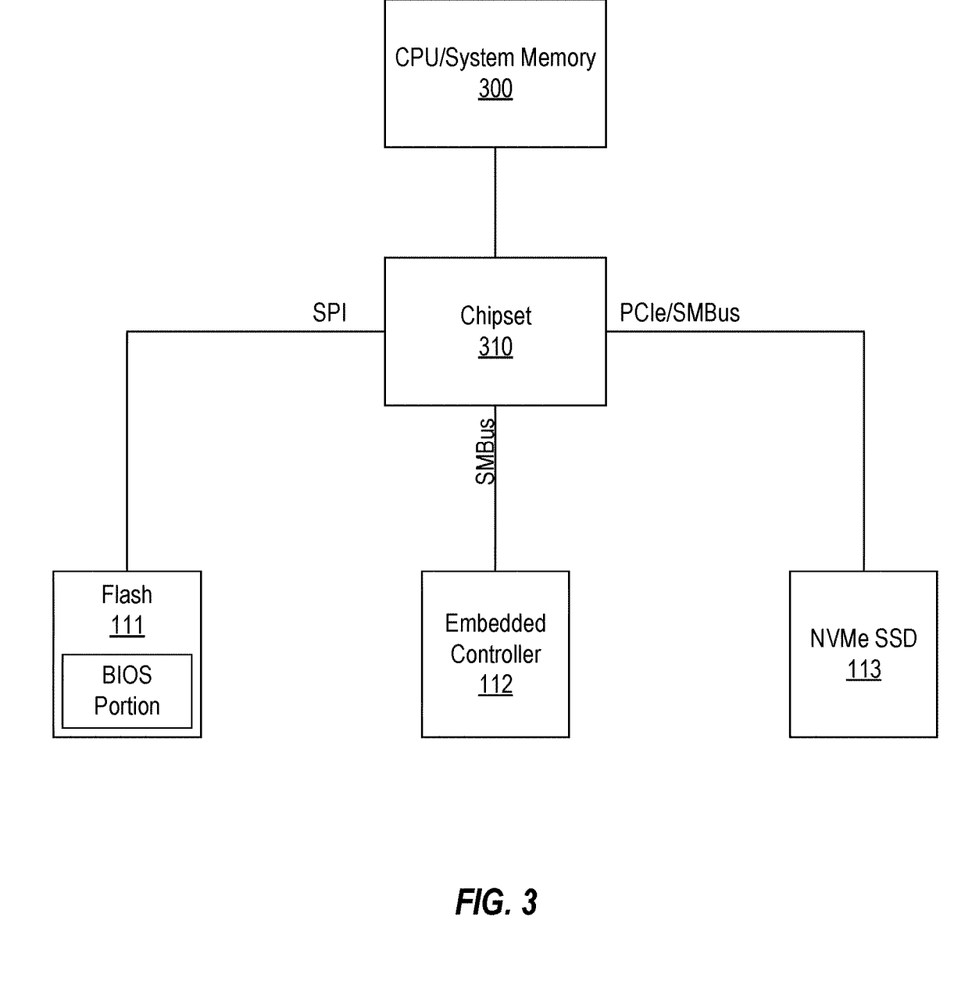
FIG. 3 provides an example platform architecture that may exist on computing systems that are configured to implement embodiments of the present invention.

FIG. 3 illustrates one example of how flash 111, embedded controller 112 and NVMe SSD 113 can be interconnected on a motherboard of a computing system. In this example, the motherboard is assumed to include a CPU 300 and a chipset 310. For simplicity, the system memory (e.g., RAM) is not separately depicted. Chipset 310 may be the Platform Controller Hub (PCH) on an Intel-based motherboard but could be the chipset that performs an equivalent function on other types of motherboards. Of primary relevance to the present invention, chipset 310 provides a way for embedded controller 112 to interface with flash 111 and NVMe SSD 113. In the depicted example, embedded controller 112 is connected to chipset 310 via a system management bus (SMBus) while flash 111 is connected via the Serial Peripheral Interface (SPI) and NVMe SSD 113 is connected via PCIe and SMBus. Other architectures of a motherboard could equally be used, and the present invention should not be limited to any particular architecture.

Figure 3A:
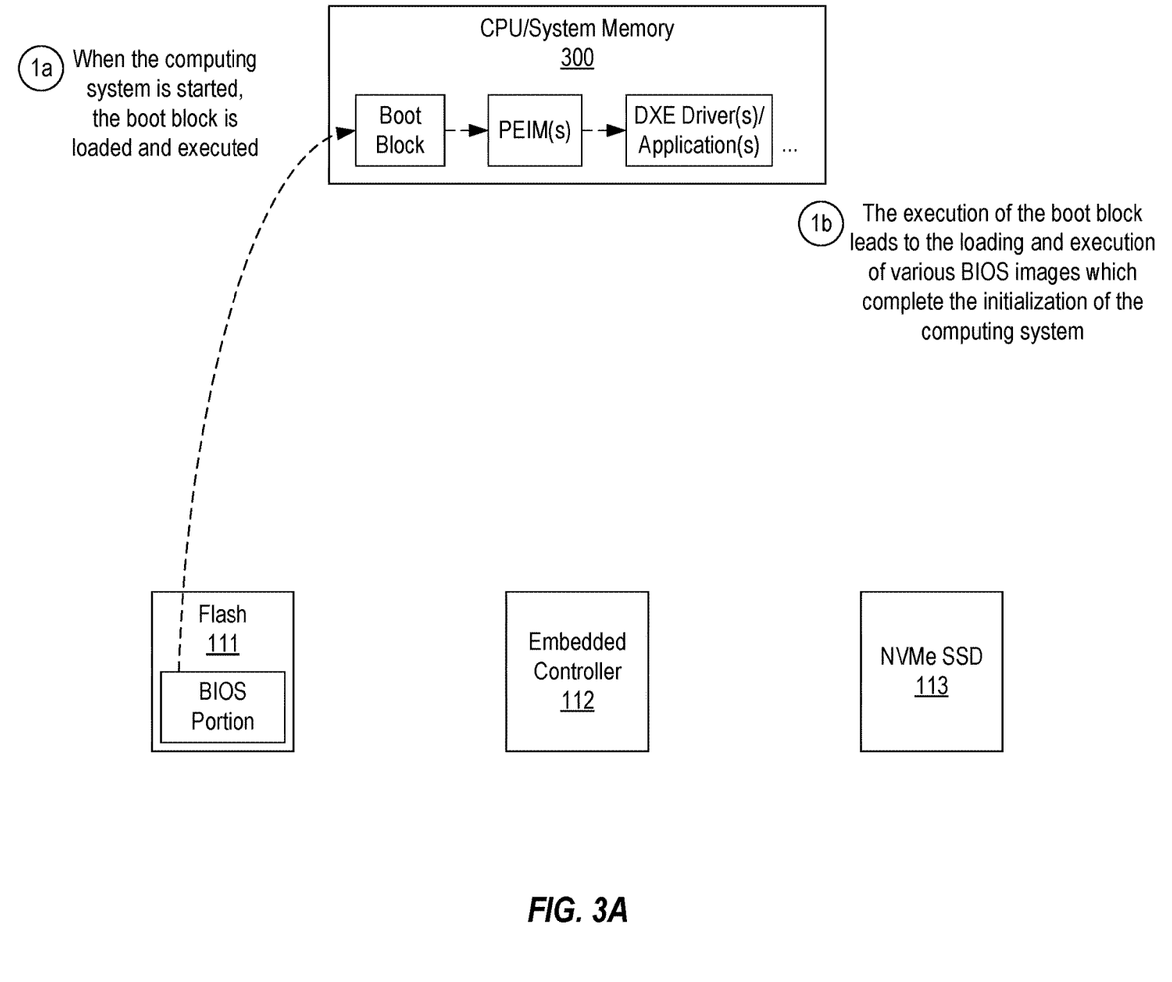
FIGS. 3A-3C represent how a computing system can be enabled to perform a BIOS boot failover process in accordance with embodiments of the present invention.
Figure 3B:
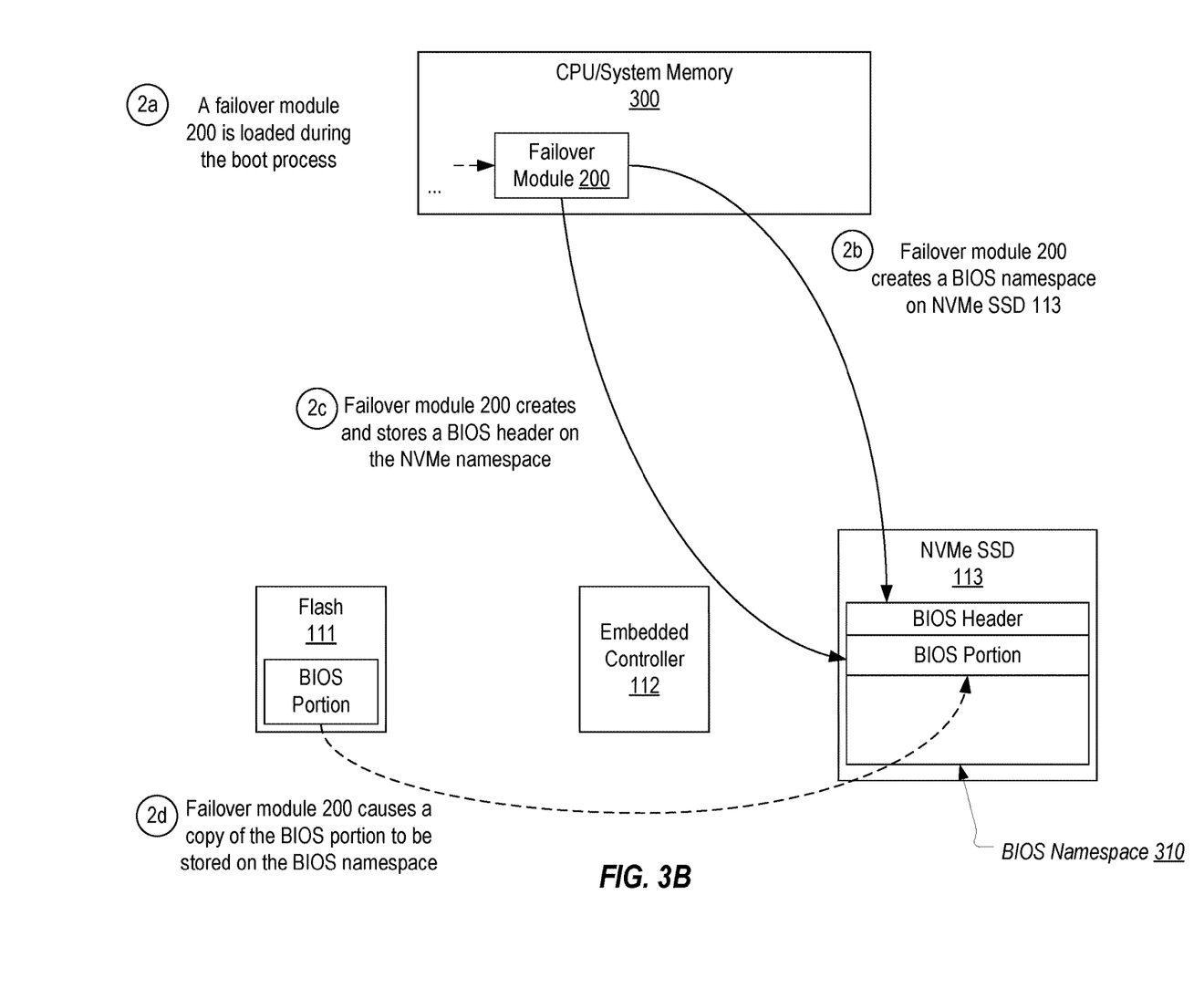
Figure 3C:
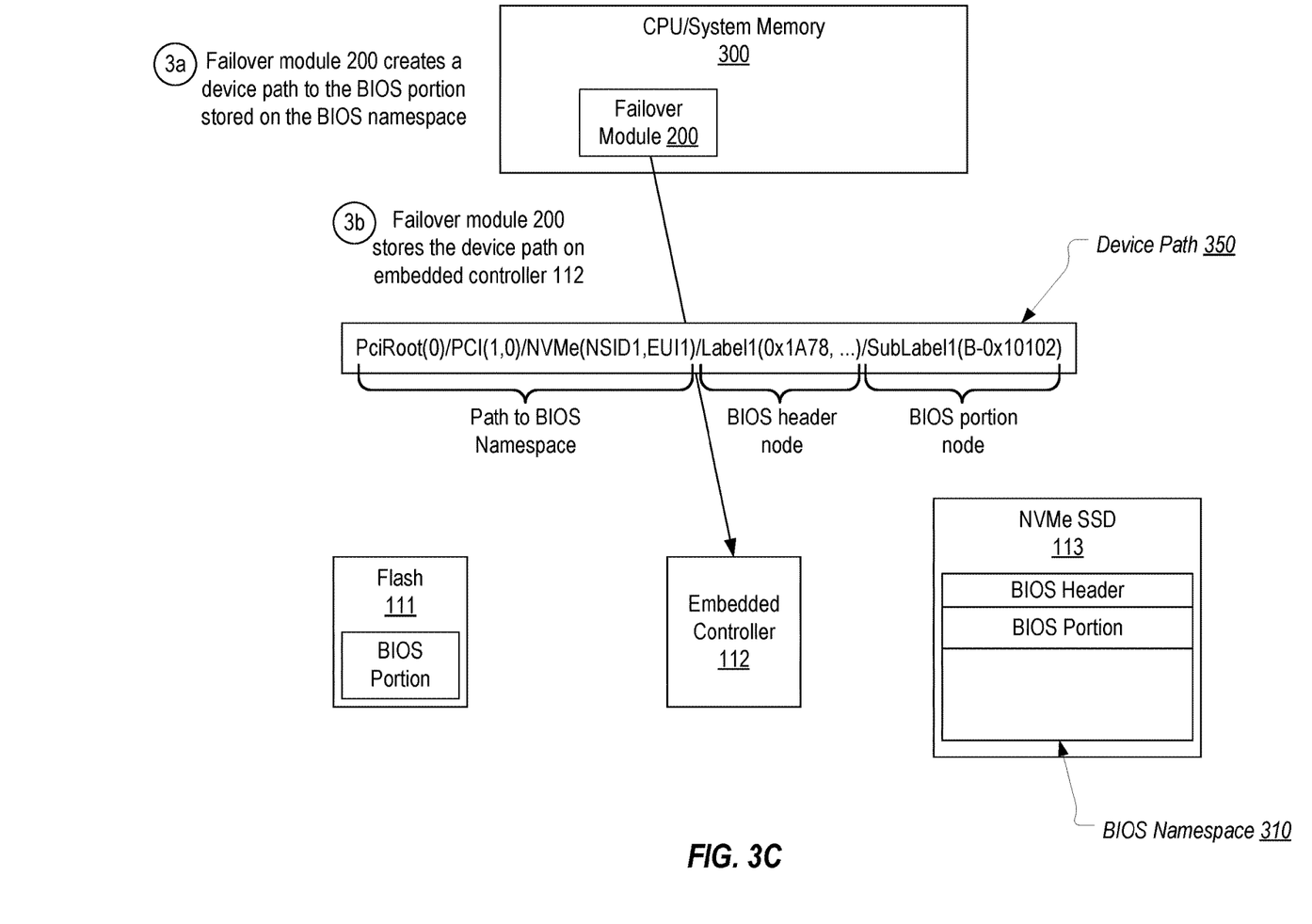

FIGS. 3A-3C provide an example of how a BIOS boot failover process can be enabled in accordance with some embodiments of the present invention. In other words, FIGS. 3A-3C represent how embodiments of the present invention can enable a computing system to successfully boot when the BIOS portion stored on flash 111 becomes unavailable. In step 1a shown in FIG. 3A, it is assumed that the computing system is powered on which will cause CPU 300 to load the boot block that is included in the BIOS portion on flash 111. The execution of the boot block leads to the loading and execution of a number of BIOS images in step 1b such as PEIMs, components that implement a UEFI platform, DXE drivers, DXE applications, etc. The exact nature and function of the BIOS images loaded in step 1b is not essential to the present invention. Of importance is that the computing system successfully performs at least some of the pre-boot process. As an example, step 1b could encompass the loading and execution of BIOS images that complete the SEC, PEI and DXE stages of the UEFI boot process such that the boot process can be viewed as having proceeded to the BDS stage.

Turning to FIG. 3B, with the boot process having proceeded successfully, in step 2a, it is assumed that failover module 200 has been loaded for execution. For example, failover module 200 could be registered to be loaded as part of the BDS phase of the UEFI boot process. In some embodiments, such as described below, failover module 200 may remain available during runtime (e.g., as a UEFI runtime service). As failover module 200 is executed, in step 2b, it can create a BIOS namespace 310 on NVMe SSD 113.

For example, failover module 200 can interface with an NVMe controller (not shown) to request the creation of an NVMe namespace, and in response, can receive a namespace ID (NSID) for the namespace that the controller creates on NVMe SSD 113. With BIOS namespace 310 created on NVMe SSD 113, in step 2c, failover module 200 may also create a BIOS header on BIOS namespace 310 to define/represent the contents of BIOS namespace 310. In step 2d, failover module 200 also causes the BIOS portion in flash 111 to be copied to BIOS namespace 310 such that the BIOS portion will exist in both flash 111 and BIOS namespace 310 on NVMe SSD 113.

Turning to FIG. 3C, in step 3a, failover module 200 creates a device path 350 (e.g., a UEFI device path) that identifies where the BIOS portion is stored on NVMe SSD 113. Then, in step 3b, failover module 200 stores device path 350 on embedded controller 112 (or in some storage media accessible to embedded controller 112). As indicated in FIG. 3C, device path 350 can include device path nodes that define the path to BIOS namespace 310 (e.g., PciRoot(0)/PCI(1,0)NVMe(NSID1, EUI1) which defines that BIOS namespace 310 exists on NVMe SSD 113 which is device 1, function 0 on the PCI root bus). Device path 350 also includes a BIOS header device path node defining the BIOS header (e.g., Label1(0x1A78, . . . ) where Label1 may represent a unique identifier (e.g., a vendor GUID) defining the device path node as a BIOS header node and 0x1A78 may define the address within BIOS namespace 310 where the BIOS header is stored) and a BIOS portion device path node that identifies the location within BIOS namespace 310 where the BIOS portion is stored (e.g., SubLabel1(B-0x10102) where SubLabel1 is a unique identifier (e.g., a vendor GUID) defining the device path node as a BIOS portion node and 0x10102 is the address within BIOS namespace 310 where the BIOS portion is stored).

Accordingly, after the steps depicted in FIGS. 3A-3C have been performed, a backup of the BIOS portion will have been stored on NVMe SSD 113 and embedded controller 112 will have been provided with device path 350 which identifies where this backup of the BIOS portion was stored. At this point, failover module 200 can allow the boot process to proceed to load of the operating system. In some embodiments, failover module 200 could unload, while in other embodiments, failover module 200 may remain running to enable runtime functionality as described below.

Figure 4A:
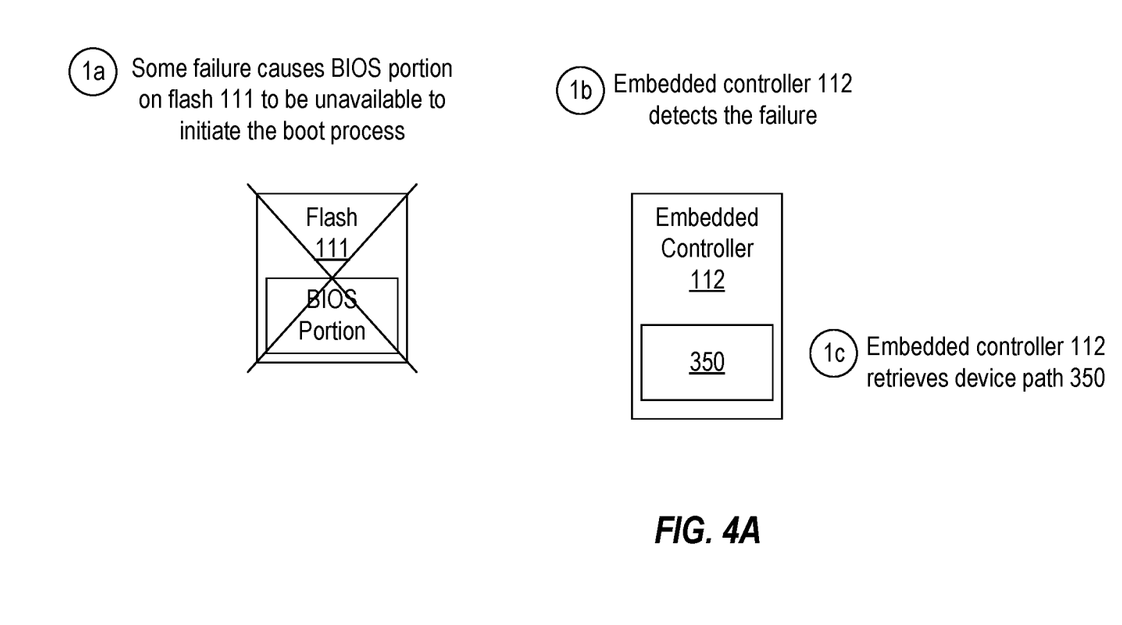
FIGS. 4A and 4B represent how a computing system can perform a BIOS boot failover process in accordance with the embodiments of the present invention.
Figure 4B:
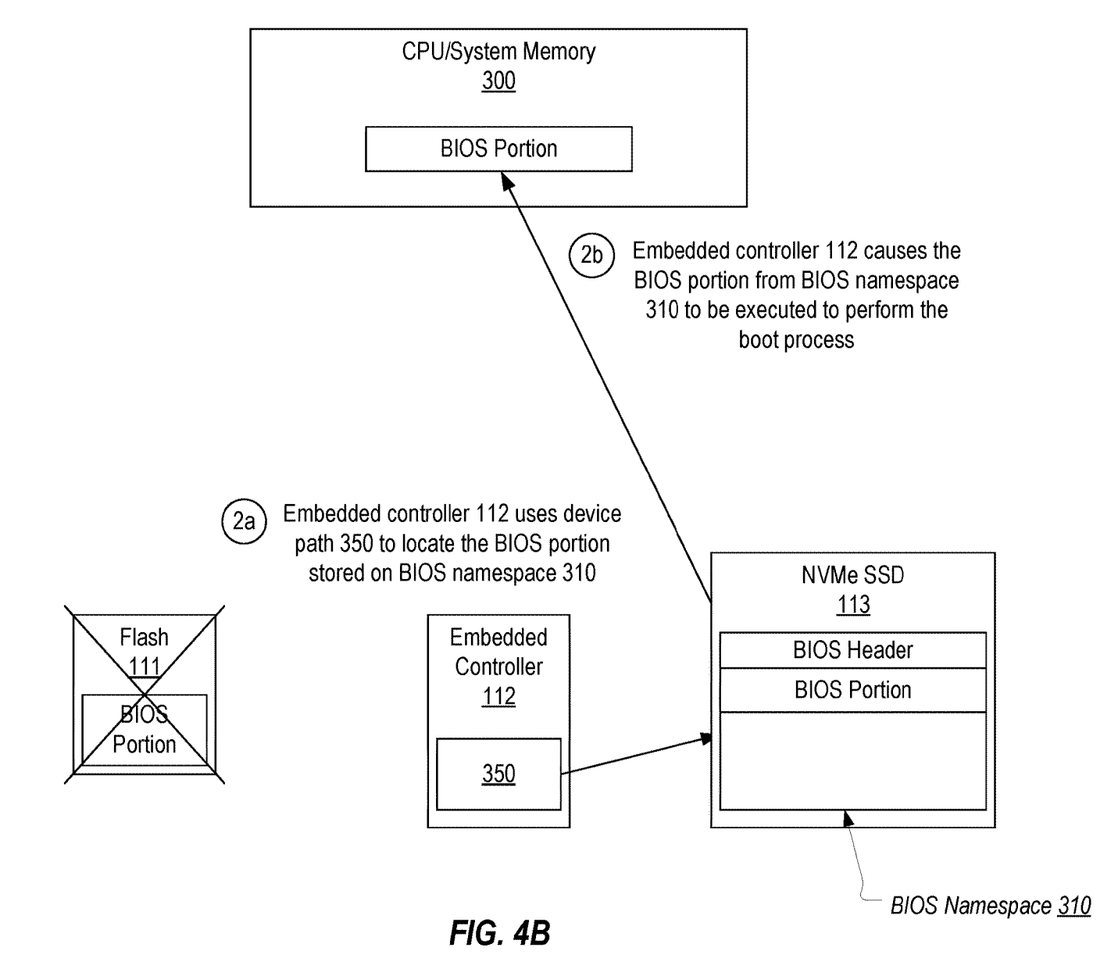

Because of the form of device path 350, embedded controller 112 will be able to determine, upon system reset and in response to a failed attempt to load the BIOS portion from flash 111, which hardware needs to be initialized to obtain the backup of the BIOS portion and where on this hardware the BIOS portion is actually stored. FIGS. 4A and 4B represent this boot failover process. It is noted that embedded controller 112 can be preconfigured to perform the functionality described below.

In step 1a shown in FIG. 4A, it is assumed that the computing system has been reset but that some failure has prevented the BIOS portion in flash 111 from being loaded. As an example only, the BIOS portion itself could have become corrupted such that, even though it may be loaded, it will not function properly to initiate the boot process. This could be the case if an update to the BIOS portion on flash 111 failed. As another example, flash 111 may have failed thereby preventing the BIOS portion from being accessed. Regardless of the reason why the BIOS portion on flash 111 has become unavailable to initiate the boot process, in step 1b, embedded controller 112 can detect the failure to load and execute the BIOS portion. Embedded controller 112 could be configured in a variety of ways to perform this detection (e.g., using an SPI fault handler), and the present invention should not be limited to any particular detection technique that embedded controller 112 may be configured to perform. In response to detecting the failure to load and execute the BIOS portion from flash 111, in step 1c, embedded controller 112 can retrieve device path 350. For example, device path 350 could be stored at a location within embedded controller 112's NVRAM where embedded controller 112 is configured to look for a device path that defines where a backup of the BIOS portion is stored.

Turning to FIG. 4B, in step 2a, embedded controller 112 can use device path 350 to locate the BIOS portion stored on BIOS namespace 310. This step may entail initializing/enumerating an NVMe controller to thereby make NVMe SSD 113 accessible. With reference to FIG. 3C, embedded controller 112 could employ the initial portion of device path 350 to determine that the NVMe controller that is device 1, function 0 on the PCI root bus should be initialized. In some embodiments, embedded controller 112 could employ the SMBus accessible via chipset 310 to perform this initialization. This step also entails employing the BIOS header and BIOS portion nodes in device path 350 to identify where on BIOS namespace 310 the BIOS portion is stored.

After having performed any necessary initializations and identifying the specific location of the BIOS portion on BIOS namespace 310, in step 2b, embedded controller 112 can cause the BIOS portion to be loaded for execution. This step may also entail employing the SMBus to read the BIOS portion from NVMe SSD 113 and cause it to be loaded into CPU 300. With the BIOS portion loaded from BIOS namespace 310, the boot process can proceed in much the same manner as if the BIOS portion had been loaded from flash 111. In other words, due to the functionality that failover module 200 and embedded control 112 perform, the computing system can be booted from the same BIOS portion even when flash 111 fails or the BIOS portion in flash 111 otherwise becomes unavailable.

Figure 5:
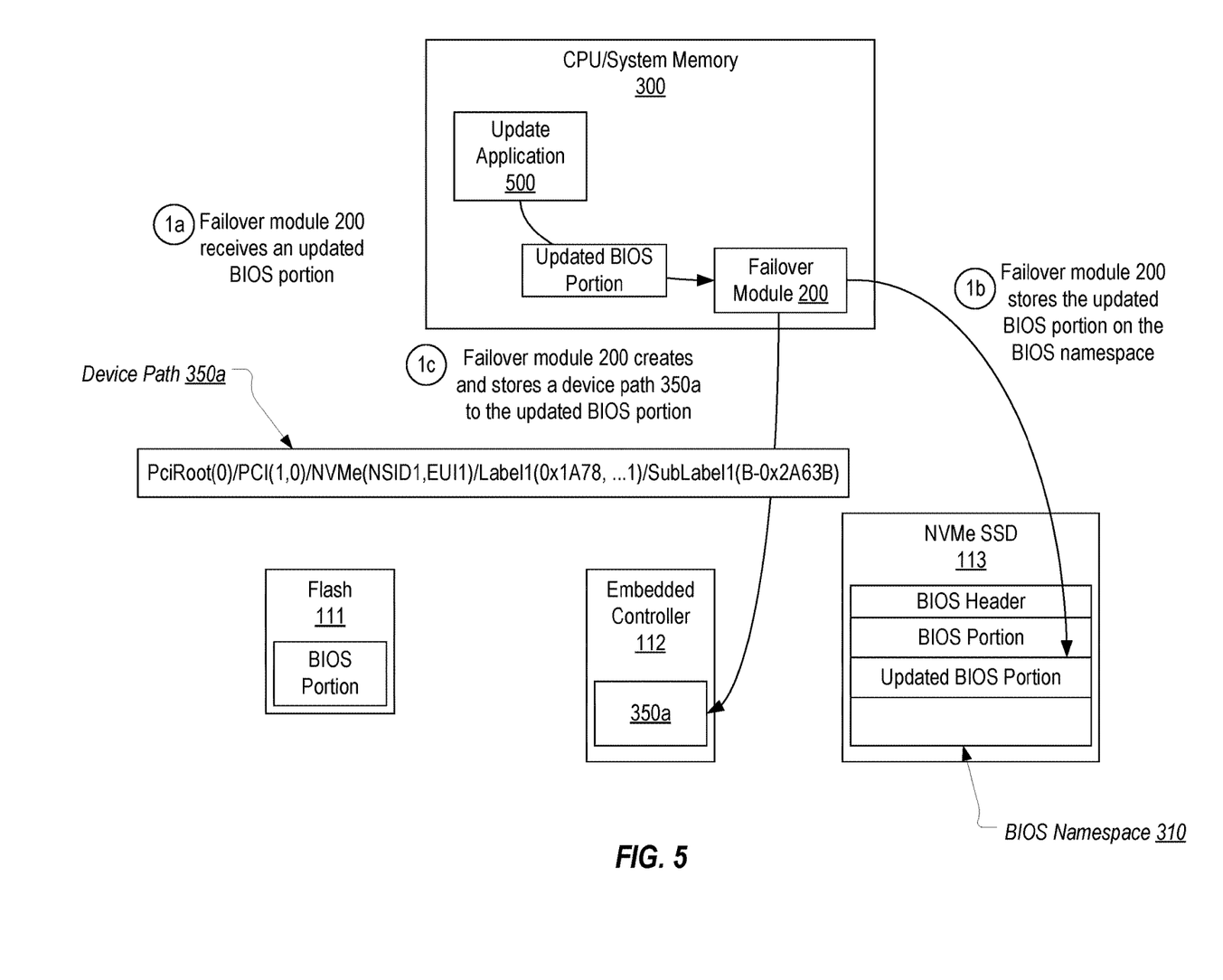
FIG. 5 represents how a BIOS update can be implemented in accordance with embodiments of the present invention.

In some embodiments, failover module 200 can be employed to perform an update to the BIOS portion stored in flash 111 using a similar technique. FIG. 5 represents this BIOS update process. In FIG. 5, it is assumed that the operating system has been loaded and that failover module 200 remains accessible (e.g., as a UEFI runtime service). Then, in step 1a, an update application 500 is employed to deliver an updated BIOS portion to failover module 200. In a similar manner as described above, in step 1b, failover module 200 can store the updated BIOS portion in BIOS namespace 310 (including updating the BIOS header as appropriate), and in step 1c, can create and store a device path 350a to the updated BIOS portion. As shown, device path 350a may match device path 350 except that the BIOS portion node defines the location of the updated BIOS portion rather than the location of the BIOS portion.

In contrast to the BIOS boot failure process described above, in this BIOS update process embedded controller 112 can also be configured to cause the updated BIOS portion in BIOS namespace 310 rather than the now-old BIOS portion in flash 111 to be used to boot the computing system. In other words, even though the BIOS portion in flash 111 may still be accessible, embedded controller 112 will alter the normal booting process to cause the updated BIOS portion to be loaded. In this way, an update to the BIOS portion can be performed without changing the BIOS portion on flash 111 thereby leaving the original BIOS portion available if it is ever desired to again boot from flash 111. Notably, this installation of the updated BIOS portion can be performed without performing a reboot.

FIG. 5 also represents that the updated BIOS portion is stored in conjunction with the "original" BIOS portion in BIOS namespace 310 which can facilitate rolling back the BIOS portion. For example, if the updated BIOS portion fails to boot the computing system, embedded controller 112 could be configured to load the original BIOS portion (or some other earlier version of the BIOS portion). In some embodiments, the BIOS header can be employed to identify the various versions of the BIOS portion that exist in BIOS namespace 310 including their relationships. Embedded controller 112 could therefore employ the BIOS header to locate and load the earlier version of the BIOS portion. Similarly, in some embodiments, failover module 200 could be configured to enable the selection of a prior version of the BIOS portion that exists in BIOS namespace 310 and, in response to such a selection, store a device path on embedded controller 112 which will cause embedded controller 112 to load the prior version of the BIOS portion at the next boot.

In view of the foregoing, embodiments of the present invention allow a BIOS failover process to be automatically performed when the flash or other storage media used to store the boot block becomes inaccessible or when the boot block is corrupted. With this BIOS failover process, it will be unnecessary to perform any of the various manual, tedious and error-prone BIOS recovery options in the event the original BIOS becomes unavailable to boot the computing system. Embodiments of the present invention may also allow a BIOS update process to be performed that does not require modifying the original BIOS or rebooting the computing system. In embodiments of the present invention, BIOS can be stored on the BIOS namespace in a secure manner (e.g., by signing the BIOS with a platform or other key used in the Secure Boot framework) to ensure that the boot process cannot be compromised.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for booting a computing system comprising:
   in response to a BIOS portion that is stored on flash storage of a computing system having been executed to perform a boot process, causing a copy of the BIOS portion to be stored on a non-volatile memory express (NVMe) namespace;
   in conjunction with causing the copy of the BIOS portion to be stored on the NVMe namespace, causing a device path to be stored on an embedded controller, the device path identifying where the copy of the BIOS portion is stored on the NVMe namespace; and
   in response to the embedded controller detecting that the BIOS portion stored on flash storage has failed to load as part of an attempt to perform the boot process, using the device path to cause the copy of the BIOS portion to be loaded to perform the boot process.

2. The method of claim 1, wherein the copy of the BIOS portion is caused to be stored on the NVMe namespace during a first successful boot of the computing system.

3. The method of claim 1, further comprising:
   wherein causing the copy of the BIOS portion to be stored on the NVMe namespace comprises creating the NVMe namespace.

4. The method of claim 1, wherein the device path includes a BIOS portion device path node that defines an address within the NVMe namespace where the copy of the BIOS portion is stored.

5. The method of claim 4, wherein the device path also includes a BIOS header device path node that identifies a BIOS header in the NVMe namespace.

6. The method of claim 5, wherein the device path also includes a device path node that identifies the NVMe namespace.

7. The method of claim 4, wherein using the device path to cause the copy of the BIOS portion to be loaded to perform the boot process comprises reading the copy of the BIOS portion from the address defined in the BIOS portion device path node.

8. The method of claim 7, wherein using the device path to cause the copy of the BIOS portion to be loaded to perform the boot process comprises enumerating an NVMe controller that is identified in the device path.

9. The method of claim 1, wherein detecting that the BIOS portion stored on the flash storage has failed to load comprises handling a Serial Peripheral Interconnect fault.

10. The method of claim 1, further comprising:
storing an updated version of the BIOS portion on the NVMe namespace; and
causing an updated device path to be stored on the embedded controller, the updated device path identifying where the updated version of the BIOS portion is stored on the NVMe namespace.

11. The method of claim 10, further comprising:
causing the updated version of the BIOS portion to be loaded to perform a subsequent boot process.

12. A computing system comprising:
a central processing unit;
system memory;
flash storage on which a BIOS portion is stored;
an embedded controller;
an NVMe drive; and
a failover module that is configured to execute during a boot process to perform the following:
create a BIOS namespace on the NVMe drive;
cause a copy of the BIOS portion to be stored on the BIOS namespace; and
cause the embedded controller to store a device path to the copy of the BIOS portion that is stored on the BIOS namespace.

13. The computing system of claim 12, wherein the embedded controller is configured to perform the following:
during a subsequent boot process, detect when the BIOS portion stored on the flash storage fails to load;
in response to the detection, employ the device path to cause the copy of the BIOS portion stored on the BIOS namespace to be loaded to perform the subsequent boot process.

14. The computing system of claim 13, wherein the device path identifies an address in the BIOS namespace where the copy of the BIOS portion is stored, and wherein employing the device path to cause the copy of the BIOS portion stored on the BIOS namespace to be loaded to perform the subsequent boot process comprises reading the copy of the BIOS portion from the address.

15. The computing system of claim 12, wherein the failover module is further configured to:
cause an updated version of the BIOS portion to be stored on the BIOS namespace; and
cause the embedded controller to store an updated device path to the updated version of the BIOS portion that is stored on the BIOS namespace.

16. The computing system of claim 15, wherein the embedded controller is further configured to employ the updated device path to cause the updated version of the BIOS portion stored on the BIOS namespace to be loaded to perform a subsequent boot process.

17. The computing system of claim 12, wherein the device path includes:
device path nodes that identify the BIOS namespace as a namespace on the NVMe drive;
a BIOS header device path node that identifies a BIOS header stored on the BIOS namespace; and
a BIOS portion device path node that identifies where the copy of the BIOS portion is stored on the BIOS namespace.

18. One or more computer storage media storing computer executable instructions which when executed on a computing system implement a method comprising:
in response to detecting that a BIOS portion stored on a flash storage has successful performed a boot process, causing a copy of the BIOS portion to be stored on a BIOS namespace on an NVMe drive;
creating a device path that identifies the BIOS namespace and where the copy of the BIOS portion is stored on the BIOS namespace; and
causing the device path to be stored on an embedded controller.

19. The computer storage media of claim 18, wherein the method further comprises:
detecting, by the embedded controller, that the BIOS portion stored on the flash storage has failed to perform a subsequent boot process;
accessing the device path; and
employing the device path to cause the copy of the BIOS portion to be loaded from the BIOS namespace to thereby cause the computing system to be booted using the copy of the BIOS portion.

20. The computer storage media of claim 18, wherein the method further comprises:
causing an updated version of the BIOS portion to be stored on the BIOS namespace;
creating an updated device path that identifies the BIOS namespace and where the updated version of the BIOS portion is stored on the BIOS namespace; and
causing the updated device path to be stored on the embedded controller.

* * * * *